United States Patent
Doushita

(10) Patent No.: US 7,041,398 B2
(45) Date of Patent: May 9, 2006

(54) MAGNETIC RECORDING MEDIUM AND MAGNETIC RECORDING AND REPRODUCING METHOD USING THE SAME

(75) Inventor: Hiroaki Doushita, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 11/088,916

(22) Filed: Mar. 25, 2005

(65) Prior Publication Data

US 2005/0214593 A1    Sep. 29, 2005

(30) Foreign Application Priority Data

Mar. 25, 2004    (JP) .................... P. 2004-090471

(51) Int. Cl.
*G11B 5/706*    (2006.01)

(52) U.S. Cl. ................................. 428/842.4

(58) Field of Classification Search ............. 428/842.4
See application file for complete search history.

(56) References Cited

U.S. PATENT DOCUMENTS

| | | | |
|---|---|---|---|
| 5,534,361 A | 7/1996 | Hisano et al. | |
| 6,607,807 B1 * | 8/2003 | Zinbo et al. | 428/141 |

FOREIGN PATENT DOCUMENTS

| | | | |
|---|---|---|---|
| JP | 60-21307 | A | 2/1985 |
| JP | 1-18961 | B2 | 4/1989 |
| JP | 6-340426 | A | 12/1994 |
| JP | 7-22224 | A | 1/1995 |
| JP | 7-109122 | A | 4/1995 |
| JP | 9-91684 | A | 4/1997 |
| JP | 2002-100506 | * | 4/2002 |

* cited by examiner

*Primary Examiner*—Stevan A. Resan
(74) *Attorney, Agent, or Firm*—Sughrue Mion, PLLC

(57) ABSTRACT

A magnetic recording medium comprising a non-magnetic support and a magnetic layer containing a ferromagnetic metal powder and a binder, wherein the ferromagnetic metal powder comprises an oxide layer and a metal portion surrounded by the oxide layer, and the ferromagnetic metal powder has an average long axis length of from 30 nm to 55 nm, a coefficient of variation of long axis length of not more than 25%, a coefficient of variation of axial ratio of not more than 20%, and a coefficient of variation of a thickness of the oxide layer of not more than 15%.

14 Claims, No Drawings

MAGNETIC RECORDING MEDIUM AND MAGNETIC RECORDING AND REPRODUCING METHOD USING THE SAME

FIELD OF THE INVENTION

The present invention relates to a magnetic recording medium such as magnetic tapes and magnetic disks and in particular, to a coating type magnetic recording medium in which a magnetic coating material composed mainly of a ferromagnetic metal powder and a binder is coated on a non-magnetic support to form a magnetic layer and to a magnetic recording medium having excellent noise in a short wavelength region, output, C/N, overwrite characteristics and de-magnetization in the storage including a high-temperature and high-humidity circumference. In particular, the invention relates to a magnetic recording medium which is suitable for a magnetoresistive (MR) head and which has low noise, high output and resistance to demagnetization in the storage including a high-temperature and high-humidity circumference.

BACKGROUND OF THE INVENTION

As recording media which are used in a computer backup unit and the like, a so-called coating type magnetic recording medium in which a magnetic coating material prepared by dispersing and kneading a magnetic powder, a binder and various additives in an organic solvent is coated on a non-magnetic support and dried is the main current because of its excellent productivity and generalization.

In recent years, realization of small size and large capacity is advancing, and following this, high-density recording is being eagerly demanded in the foregoing coating type recording medium, too.

In recent years, in magnetic recording and reproducing systems for recording and reproducing a computer data, a system integrated with a thin film magnetic head is put into practical use. Since the thin film magnetic head is readily miniaturized or processed into a multitrack head, a multi-track stationary head of a thin film magnetic head is frequently utilized especially in a system using a magnetic tape as a recording medium. By utilizing a thin film magnetic head, it becomes possible to enhance the track density or enhance the recording efficiency due to the miniaturization and to realize high-density recording. Also, it becomes possible to enhance a data transfer speed due to the multi-tracking. The thin film magnetic head is divided roughly into an induction type head which is responsible to a time change of magnetic flux and a magnetoresistive head (MR head) utilizing a magnetoresistive effect which is responsible to a size of magnetic flux. Since the induction type head is of a planar structure, the number of turns of head coil is small, and it is difficult to increase a magnetomotive force, leading to a problem that a sufficient reproducing output is not obtained. For that reason, an MR head from which a high reproducing output is readily obtained is used for the reproduction, whereas an induction type head is used for the recording. Such a magnetic head is usually integrated into a system. In such a magnetic recording system, linear recording mode capable of realizing a faster data transfer speed is employed.

For the purpose of realizing high-density recording of a coating type magnetic recording medium, there have been studied and proposed various methods from the viewpoints of use of iron or an alloy magnetic powder composed mainly of iron in place of conventionally used magnetic iron oxide powders, enhancement of magnetic characteristics of a magnetic layer by improvement of a magnetic body such as finely dividing of a magnetic powder or by improvement of filling properties or orientation properties thereof, enhancement of dispersibility of a ferromagnetic powder, enhancement of surface properties of a magnetic layer, and the like.

For example, a method of using a ferromagnetic metal powder or a hexagonal ferrite powder as a ferromagnetic powder for the purpose of enhancing magnetic characteristics is disclosed in, for example, JP-A-58-122623, JP-A-61-74137, JP-B-62-49656, JP-B-60-50323, U.S. Pat. Nos. 4,629,653, 4,666,770 and 4,543,198.

JP-B-1-18961 discloses a ferromagnetic powder having a specific surface area of from 30 to 55 $m^2/g$, a coercive force of 1,300 Oe or more, and an amount of saturation magnetization of 120 emu/g or more as a metallic magnetic powder having a long axis size of from 0.05 to 0.2 μm and an axial ratio of from 4 to 8 and provides a fine metal powder having a small specific surface area. Also, JP-A-60-11300 and JP-A-60-21307 disclose a manufacturing process of a fine iron α-oxyhydroxide acicular crystal which is suitable for a ferromagnetic powder, especially a ferromagnetic metal powder, and the latter discloses that a ferromagnetic metal powder having an Hc of from 1,450 to 1,600 Oe and a σs of from 142 to 155 emu/g can be produced from a goethite having a long axis length of from 0.12 to 0.25 μm and an axial ratio of from 6 to 8. JP-A-9-91684 proposes to use ferromagnetic metal particles containing ferromagnetic metal particles having an average long axis size of from 0.05 μm to 0.12 μm and an axial ratio of 8 or more in a proportion of not more than 5.0% of the whole of the ferromagnetic metal particles, or ferromagnetic metal particles containing ferromagnetic metal particles having an axial ratio of a crystallite constituting the particles of 4 or more in a proportion of not more than 17.0% of the whole of the ferromagnetic metal particles. However, if particles having a small axial ratio are intermixed, a ferromagnetic powder having a high Hc is hardly obtained, and the S/N and the overwrite characteristics are insufficient.

Further, JP-A-6-340426 and JP-A-7-109122 disclose mono-dispersed spindle type hematite particles using a hematite nuclear crystal, iron hydroxide and specific ions and an extremely fine ferromagnetic powder obtained by reducing the foregoing hematite particles.

Also, for the sake of enhancing the dispersibility of a ferromagnetic powder, it is proposed to use various surfactants (as disclosed in, for example, JP-A-52-156606, JP-A-53-15803 and JP-A-53-116114) or to use various reactive coupling agents (as disclosed in, for example, JP-A-49-59608, JP-A-56-58135 and JP-B-62-28489).

Also, JP-A-1-239819 discloses a magnetic powder prepared by adhering a boron compound, an aluminum compound or an aluminum compound and a silicon compound successively onto the particle surface of magnetic iron oxide and describes that the magnetic characteristics and dispersibility are improved. Further, JP-A-7-22224 discloses a magnetic metal powder containing not more than 0.05% by weight of an element belonging to the group 1a of the periodic table and optionally containing from 0.1 to 30 atomic % of aluminum based on the total amount of metal elements and further from 0.1 to 10 atomic % of a rare earth element based on the total amount of metal elements, wherein the residual amount of an element belonging to the group 2a of the periodic table is not more than 0.1% by weight and describes that a high-density magnetic recording medium having good storage stability and magnetic characteristics is obtained.

Further, for the sake of improving the surface properties of a magnetic layer, there is proposed a method of improving a surface forming processing method of a magnetic layer after coating and drying (as disclosed in, for example, JP-B-60-44725).

On the other hand, for the purpose of achieving a high recording density of a magnetic recording medium, realization of shortening a wavelength of signals to be used is eagerly being advanced. However, if the length of a region where signals are recorded becomes a size comparable to the size of a magnetic body as used, it is impossible to prepare a distinct magnetization transition state, and therefore, it is substantially impossible to execute recording. For that reason, it is required to develop a magnetic body having a sufficiently small particle size against the shortest wavelength to be used, and it has been pointed for many years to finely divide the magnetic body.

In a metal powder for magnetic recording, the particle shape is made acicular to impart shape anisotropy, thereby obtaining a targeted coercive force. For the sake of achieving high-density recording, it is well known by those skilled in the art that it is necessary to make the surface roughness of a medium obtained by finely dividing a ferromagnetic metal powder small. However, if the metal powder for magnetic recording is finely divided, following this, the axial ratio is lowered, whereby a desired coercive force is not obtained.

In a magnetic recording system integrated with an MR head, there are the following problems with respect to the adaptability of the MR head with a magnetic recording medium to be used in this system. That is, in the case where a magnetic recording medium having a relatively thick (0.3 μm) magnetic layer is used, since the magnetic flux of the magnetic layer becomes high, a reproducing output is excessively high so that the MR head is saturated, whereby the reproducing waveform is warped. As a result, a sufficiently high S/N value is not obtained, and an error rate likely increases. Also, in general, for the sake of achieving a high recording density, it is desired that the recording and reproducing waveform (isolated reproducing inverse waveform) is sharper (the half value width of the waveform is small). However, it has been noted that in a magnetic recording medium having a relatively thick magnetic layer, the half value width of the recording and reproducing waveform becomes large, whereby a sufficient high recording density is not obtained. On the other hand, in the case where a magnetic recording medium having a very thin (0.03 μm) magnetic layer is used, the recording and reproducing waveform is warped. As a result, it has been noted that a high S/N value is not obtained, too and that the reproducing output itself is likely lowered. Also, in a magnetic recording medium which is suitably used in a magnetic recording and reproducing system integrated with an MR magnetic head capable of achieving recording at a fast data transfer rate and at a high density, it is considered that an extremely fine ferromagnetic powder is necessary. However, if the particle becomes fine, it has become difficult to manufacture a ferromagnetic powder which is satisfied with both magnetoelectric transform characteristics and storage stability (weather resistance). With respect to a magnetic powder to be used in a high-density recording region, the magnetic powder must be a fine particle having excellent magnetic characteristics. However, in a magnetic powder, if the size is small, a portion of fine particles exhibiting superparamagnetic properties becomes high, whereby the magnetic characteristics are markedly lowered.

In the light of the above, with respect to magnetic recording media using a ferromagnetic metal powder, which have hitherto been employed, various studies are made. However, it is the actual situation that ones from which good magnetoelectric transform characteristics are obtained and which are satisfactory as an excellent high-density recording medium have not been obtained yet.

SUMMARY OF THE INVENTION

Under the foregoing conventional actual situations, the invention has been proposed. An object of the invention is to provide a magnetic recording medium from which good magnetoelectric transform characteristics are obtained and which is excellent in high-density recording and excellent in storage stability (weather resistance).

In order to achieve the foregoing object, the present inventors made extensive and intensive investigations. As a result, the inventors paid an attention to a scattering of the size of a metal portion of a ferromagnetic metal powder and led to a magnetic recording medium of the invention by using a ferromagnetic metal powder in which a coefficient of variation of long axis, a coefficient of variation of axial ratio and a coefficient of variation of oxide film thickness are controlled at fixed values or less, respectively.

Specifically, a magnetic recording medium having excellent weather resistance, a high recording density, a low noise and a high output is achieved according to the following requirements.

(1) A magnetic recording medium comprising a non-magnetic support having thereon at least one magnetic layer containing a ferromagnetic metal powder and a binder, wherein the ferromagnetic metal powder to be contained in the magnetic layer has an average long axis length (average major axis length) of from 30 nm to 55 nm, a coefficient of variation of long axis length of not more than 25%, a coefficient of variation of axial ratio of not more than 20%, and a coefficient of variation of oxide film thickness of not more than 15%.

(2) The magnetic recording medium as set forth above in (1), which contains a substantially non-magnetic lower layer between the magnetic layer and the non-magnetic support.

(3) A recording and reproducing method of a magnetic recording medium, which comprises reproducing signals recorded on the magnetic recording medium as set for the above in (1) or (2) at a maximum linear recording density of 140 KFCI or more using a magnetoresistive head (MR head).

The magnetic recording medium of the invention is characterized in that by controlling the coefficient of variation of long axis length, the coefficient of variation of axial ratio and the coefficient of variation of oxide film thickness of the ferromagnetic metal powder at fixed values or less, the proportion of fine powders in the ferromagnetic metal powder is reduced. When the magnetic powder itself becomes fine, the proportion of extremely fine components becomes high due to scatterings of the shape and size. In such fine particles, ones having an extremely high coercive force are present and become a cause of the generation of noises. Also, in the particles having a small size, ones exhibiting superparamagnetic properties appear and become a cause of the generation of noises or a drop of the output. Accordingly, by making the proportion of a fine powder, it becomes possible to improve the noise characteristics or output.

According to the invention, it is possible to provide a magnetic recording medium from which good magnetoelectric transform characteristics are obtained and which is excellent in high-density recording and excellent in storage stability (weather resistance) and which is suitable for a system mounting a magnetoresistive (MR) head as a reproducing head.

DETAILED DESCRIPTION OF THE INVENTION

Preferred embodiments of the invention are as follows.
(a) The ferromagnetic metal powder is a ferromagnetic metal powder made of a metal portion and an oxide layer present in the surrounding thereof and has a coefficient of variation of oxide film thickness of not more than 15% and a coercive force of from 160 to 320 kA/m.
(b) The ferromagnetic metal powder is a spindle type acicular particle, has an average axial ratio in the range of from 3.5 to 5.5, and contains Fe as the major component and at least Co, Al and a rare earth element, wherein the content of cobalt is in the range of from 5 to 45 atomic % in terms of Co/Fe, the content of Al is in the range of from 4 to 10 atomic % in terms of Al/Fe, and the content of the rare earth element is 10 atomic % or more in terms of (total sum of the rare earth elements)/Fe.
(c) The rare earth element to be contained in the ferromagnetic metal powder is at least one member selected from Y, La, Ce, Pr, Nd, Sm, and Gd.
(d) In the magnetic recording medium, an increase of Hc falls within 2.5%.
(e) In the magnetic recording medium, [residual magnetic flux ($\Phi r$)]=[residual magnetic flux density (Br)]×[magnetic layer thickness ($\delta$)] is from 5 to 75 mT·μm.
(f) The magnetic recording medium comprises a non-magnetic layer composed mainly of a non-magnetic powder and a binder resin between the non-magnetic support and the magnetic layer, and the magnetic layer has a surface roughness of not more than 3.0 nm in terms of center plane average surface roughness.

First of all, the ferromagnetic metal powder of the invention will be hereunder described. The ferromagnetic metal powder of the invention is one in which the size {that is, the average long axis length and the axial ratio [(long axis length)/(minor axis length)]} and the coefficient of variation of oxide film thickness are respectively specified and lowers SFD, whereby a magnetic recording medium having improved magnetoelectric characteristics and excellent weather resistance can be provided.

In the invention, the coefficient of variation refers to [(standard deviation)/(average value)×100]. The ferromagnetic metal powder of the invention has a peak assigned to α-Fe by the X-ray diffraction. The average long axis length is from 30 to 55 nm, and preferably from 30 to 50 nm. The coefficient of variation of long axis length is not more than 25%, and preferably not more than 20%. Also, the average axial ratio {an average value of [(long axis length)/(minor axis length)]} is preferably from 3.5 to 5.5. When the average axial ratio is less than 3.5, the coercive force Hc based on the shape anisotropy is small so that such is disadvantageous for high-density recording. The coefficient of variation of axial ratio of the ferromagnetic metal powder is not more than 20%, and a smaller value is preferable. When the coefficient of variation of long axis length and the coefficient of variation of axial ratio are small, the Hc distribution is small, and therefore, such is preferable. In the case where the average powder size is constant, the coefficient of variation of long axis length and the coefficient of variation of axial ratio are small, the Hc distribution is small, and SFD (Switching-Field Distribution) is liable to become small. Especially, the axial ratio largely contributes thereto.

The crystallite size of the ferromagnetic metal powder means a value as determined by dividing the sum of respective peaks (half-value widths) of the 110-face and the 220-face by the X-ray diffraction by 2 and is from 80 to 130 angstroms, preferably from 80 to 125 angstroms, and more preferably from 80 to 120 angstroms. When the crystallite size is smaller than 80 angstroms, the Hc becomes small and the weather resistance is deteriorated, and therefore, such is not preferable. On the other hand, when it exceeds 130 angstroms, the noise becomes extremely large, and therefore, such is improper.

The σs of the ferromagnetic metal powder of the invention is from 100 to 130 A·m²/kg, preferably from 105 to 128 A·m²/kg, and more preferably from 105 to 125 A·m²/kg. When the σs is less than 100 A·m²/kg, not only the deterioration of SFD becomes large, but also the Hc becomes small, and therefore, such is disadvantageous for high-density recording. On the other hand, when the σs exceeds 130 A·m²/kg, Br (residual magnetic flux density) becomes high so that even when the thickness of the magnetic layer is made thin, the residual magnetic flux ($\Phi r$) of the magnetic recording medium becomes high, thereby saturating the MR head, leading to adverse influences such as the generation of waveform warping and the generation of asymmetry of pulse. Also, when the degree of filling is lowered to reduce the residual magnetic flux density, the thickness of the magnetic layer becomes thin and the amount of the ferromagnetic metal powder particles which are present per unit area becomes small, whereby it becomes impossible to obtain a necessary S/N. When gradual oxidation is strengthened to thicken the oxide film, thereby lowering the σs, the SFD becomes large, and especially when the average long axis length is not more than 65 nm, an increase of SFD is remarkable. Accordingly, it is effective to control the gradual oxidation condition, thereby making the oxide layer (oxide film) of the surface minute and making it thin as far as possible. The reason why when the average long axis length is not more than 65 nm, the increase of SFD is remarkable resides in the matter that particles have a distribution in each of the long axis length, the minor axis length and the oxide film thickness, whereby when the long axis length is small, the proportion of fine particle components in a region where a thermal fluctuation is large becomes relatively large. That is, it is thought that this is caused by the matter that the content of a superparamagnetic component becomes high. Further, it is thought that this is caused by the matter that by lowering the σs upon gradual oxidation, the super-paramagnetic component further increases. It has been noted that when the average oxide film thickness is thinner than 2.5 nm, the influence of the variation of film thickness becomes large, thereby generating an increase of demagnetization and an increase of SFD. It is effective to keep the average oxide film thickness of the ferromagnetic metal powder at the range of from 2.6 to 3.3 nm, thereby keeping uniformity of the oxide film.

The coercive force Hc of the ferromagnetic metal powder is preferably from 160 to 320 kA/m, more preferably from 165 to 280 kA/m, and especially preferably from 167 to 230 kA/m. As described previously, it is assumed that by defining the average long axis length and the average oxide film thickness of the ferromagnetic metal powder, it has become possible to reveal the Hc based on the shape anisotropy and to make the Hc distribution small. Incidentally, there is a tendency that when the σs is small, the Hc when formed into a magnetic recording medium becomes large against the Hc of the powder.

It is preferable that the ferromagnetic metal powder of the invention contains from 5 to 45% by weight of Co based on Fe in addition to Fe. Also, it is preferable that the ferromagnetic metal powder of the invention contains atoms such as Al, Si, S, Ti, V, Cr, Cu, Y, Mo, Rh, Pd, Ag, Sn, Sb, Te, Ba, Sr, W, Au, Pb, Bi, La, Ce, Pr, Nd, P, Mg, Mn, Zn, Sr, B, and Ca in a proportion of not more than 20% by weight in terms of weight ratio in addition to Fe and Co. In particular, it is preferable that the content of Al is in the range of from 4 to 10 atomic % in terms of Al/Fe and that the content of a rare earth element is 10 atomic % or more in terms of (total sum of rare earth elements)/Fe. The rare earth element as referred to herein means Y and lanthanide elements. Specific examples thereof include Y, La, Ce, Pr, Nd, Pm, Sm, Eu, Gd, Tb, Dy, Ho, Er, Tm, Yb, and Lu, with Y, La, Ce, Nd, Sm and Gd being especially preferable. These elements are effective for controlling the shape of the starting material, preventing sintering between particles and promoting reduction, and controlling the shape of the reduced ferromagnetic metal powder and irregularities of the particle surface.

In the invention, with respect to the size and form of the starting material, it is preferable that by using one having a small coefficient of variation of each of the long axis length and the axial ratio, the size and the coefficient of variation of the ferromagnetic metal powder particles are made small, and the proportion of particles having a single crystalline structure is made large as far as possible as compared with the conventional polycrystalline structure. In the ferromagnetic metal powder of the invention, it is preferred to use a monodispersed goethite or a monodispersed hematite as the starting material. For the sake of ultimately reducing it into a metal, the starting material is reduced with pure hydrogen. The surface oxide layer capable of giving the average oxide film thickness of the invention can be formed in the surrounding of a metal portion by forming a metal portion and then undergoing a known oxidation method such as the foregoing gradual oxidation treatment. When a carbon dioxide gas is contained in the gas to be used in the gradual oxidation treatment, it is adsorbed in the basic point on the surface of the ferromagnetic metal powder, and therefore, such a carbon dioxide gas may be contained.

The oxide which constitutes the surface oxide layer of the ferromagnetic metal powder of the invention may be a magnetic oxide or a non-magnetic oxide. Also, a small amount of a metal element such as Al, Mg, Si, Y, rare earth elements, Ca, Ba, Sr, and Ni may be present in the form of a solid solution. As the magnetic oxide, ones having a saturation magnetization of from 50 to 90 A·m²/kg are preferable. Examples of magnetic iron oxides include $Co_x Fe_{(1-x)}O_y$ (for example, $CoFe_2O_4$ and $CoFe_3O_4$) and $FeO_x$ (wherein $1.33 \leq x \leq 2$, for example $\gamma\text{-}Fe_2O_3$, $Fe_3O_4$, and Berthollide compounds). Also, the non-magnetic oxide includes single compounds or composites including crystalline or amorphous metal oxides, oxyhydroxides, hydroxides, and hydrated oxides. This non-magnetic oxide is mainly derived from an element to be added as a sintering preventive agent and an element to be added at the time of formation of the ferromagnetic metal powder raw material.

Also, though the surface oxide layer is constructed of a magnetic oxide alone, a non-magnetic oxide alone, or a combination thereof, its structure is not particularly limited. In the case where the surface oxide layer is constructed of a combination of the both, the magnetic oxide and the non-magnetic oxide may be intermixed with each other or may form a layer independently. In the case where independent layers are provided in the surface portion of the ferromagnetic metal particle, the metal phase and the magnetic oxide phase, and the magnetic oxide phase and the non-magnetic oxide phase at the interface between the respective layers may be intermixed with each other. The magnetic oxide layer and the non-magnetic oxide layer may be formed in this order in the surrounding of the metal portion toward the particle surface direction.

The average oxide film thickness of the ferromagnetic metal powder of the invention means an average thickness of the surface oxide layer and refers to a value which can be measured by the following method. That is, a lattice image of the ferromagnetic metal powder is observed by a high resolution transmission electron microscope, thereby determining the thickness of the oxide layer (oxide film) present in the surrounding of the metal portion occupying the inside of the ferromagnetic metal powder from the whole of the ferromagnetic metal powder. This method will be specifically described below. First of all, particles as ultrasonically dispersed in water are placed on a mesh and photographed using a transmission electron microscope, H-9000 Model (manufactured by Hitachi, Ltd.) (at 300 kV), thereby obtaining a picture having an overall magnification of 3,000,000 times. Next, a boundary line of the boundary portion between the metal portion and the film portion and a line of the surface of the film portion are taken by a scanner, and a space between the lines is automatically measured by a Kontron's image analyzer, KS-400, thereby determining an average oxide film thickness. With respect to the number of measurement, one particle is measured at 150 points, and 15 particles (2,250 points in total) are measured, thereby determining an average oxide film thickness and a standard deviation. In order to obtain more precise values, it is preferred to carry out the measurement with respect to 500 or more particles. The coefficient of variation of oxide film thickness is determined by dividing the standard deviation of oxide film (oxide layer) thickness by the average oxide film thickness.

Also, with respect to crystallinity of the ferromagnetic metal powder constructive portion, it can be analyzed by a crystal structure analyzer such as an X-ray diffraction analyzer other than a transmission electron microscope. Also, the composition and internal construction of the particle can be analyzed more accurately by a combination of analyzers capable of performing analysis in the depth direction, such as ESCA, AFM, and an Auger microscope.

The ferromagnetic metal powder of the invention can be subjected to a treatment with a dispersant, a lubricant, a surfactant, an antistatic agent, etc. as described later in advance prior to dispersion. Concretely, such a treatment is described in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005 and 3,389,014.

The water content of the ferromagnetic metal powder is desirably from 0.01 to 2% by weight. However, it is desired to optimize the water content within the foregoing range according to the kind of a binder as described later.

The tap density of the ferromagnetic metal powder is desirably from 0.2 to 0.8 g/mL. In the case where the tap density exceeds 0.8 g/mL, when the powder is gradually oxidized, the gradual oxidation does not proceed uniformly. Accordingly, it is difficult to handle the powder with safe, or the magnetization of the obtained magnetic recording medium tends to be lowered with time. On the other hand, in the case where the tap density is less than 0.2 g/mL, the dispersion becomes likely insufficient.

Next, a method of manufacturing the ferromagnetic metal powder of the invention will be hereunder described. The method of obtaining the ferromagnetic metal powder is not particularly limited, but any arbitrary method is employable. Preferably, the following method can be enumerated. That is, a starting material having uniform long axis length and axial ratio and uniform particle size is subjected to a sintering preventive treatment and reduction, it is possible to control a metal (for example, Fe) from a metal oxide (for example, $FeO_x$ ($1 \leq x \leq 1.5$) such as $Fe_2O_3$ and $Fe_3O_4$). Examples of the starting material include a monodispersed goethite and a monodispersed hematite each having a uniform particle size distribution such that the particle is not branched.

In the starting material, it is preferable that the average long axis length is from 40 to 100 nm and that the average axial ratio is from 3 to 12. It is important that the starting material has uniform long axis length, minor axis length and axial ratio. When a raw material having an average long axis length of less than 40 nm is used, it is impossible to make each of Hc and Bm fall within the desired range. On the other hand, when a raw material having an average long axis length exceeding 100 nm is used, the surface roughness of the magnetic recording medium becomes large and the noise becomes large, whereby an excellent S/N may not be obtained. When the axial ratio exceeds 12, stable manufacture becomes difficult, and the degree of filling of the magnetic recording medium becomes likely irregular. Also, a component having a high coercive force increases, and overwrite characteristics tend to be deteriorated. On the other hand, when the axial ratio is less than 6, when formed into a ferromagnetic metal powder, the coercive force is small, and the SFD increases. Therefore, it may become possibly difficult to use the resulting ferromagnetic metal powder as a magnetic recording medium for high-density recording.

Further, examples of means for controlling the ferromagnetic metal powder include the following methods (1) and (2).

(1) The elemental composition of the inside of the ferromagnetic metal powder is to be mainly specified. Especially, in a ferromagnetic metal powder composed mainly of Fe or Fe—Co as the metal portion, a minor element which acts mutually with Fe is to be specified. As the minor element, Ca, Mn, Ni, Cr, Mg, etc. are preferable. It is preferable that this minor element is added at the time of preparation of a goethite or a hematite and/or added by a surface treatment after preparation of a goethite or a hematite. Also, it is an important element that a sintering preventive agent is doped and/or adhered for the purpose of preventing sintering from occurring. It is known that Si, Al, a rare earth element, and the like are effective as the sintering preventive.

(2) In a measure for reducing an oxide of a ferromagnetic metal element to form a ferromagnetic metal powder, conditions of a pre-treatment before the reduction, for example, dehydration conditions of a goethite, etc., annealing conditions (for example, temperature, atmosphere, treatment time, a difference in temperature between the first stage and the second stage), and the reduction conditions, for example, temperature, reducing gas, and reduction treatment time are to be selected. In particular, for the purposes of keeping the sizes of long axis length and minor axis length of the ferromagnetic metal powder uniform and making the axial ratio fall within the range of from 3.3 to 5.5, it is very important to repeat stepwise the reduction treatment and the gradual oxidation treatment, thereby controlling the shape, the crystallinity and the thickness of the oxide layer and controlling the crystallinity of the oxide layer.

Concretely, in the case of treating the minor element-containing goethite obtained in the foregoing (1), the respective conditions are as follows. With respect to the dehydration conditions, the dehydration treatment is carried out in a ventilation type or rotation type electric furnace under a nitrogen atmosphere usually at from 250 to 400° C., and preferably from 300 to 400° C. for from 0.5 to 2 hours, and preferably from 0.5 to 1 hour. With respect to the annealing conditions, the annealing treatment is carried out in a ventilation type reducing furnace under a nitrogen atmosphere usually at from 500 to 800° C., and preferably from 550 to 700° C. for from 1 to 5 hours, and preferably from 2 to 3 hours. There may be provided a step in which after the dehydration treatment, the hematite obtained by the dehydration treatment is washed with water to remove a soluble alkali metal prior to the annealing treatment. For example, with respect to the dehydration and annealing treatments and the gradual oxidation treatment, it is effective to carry out temperature elevation in a stepwise manner such that the temperature is gradually increased from a low temperature to a high temperature, preferably the dehydration treatment is carried out at from 250 to 300° C. at the beginning, then at from 300 to 350° C., and finally at from 350 to 400° C., and the annealing treatment is carried out at from 500 to 550° C. at the beginning, then at from 550 to 650° C., and finally at from 600 to 800° C. and repeat these treatments, thereby controlling the shape, the crystallinity and the thickness of the oxide layer and controlling the crystallinity of the oxide layer.

With respect to the reduction conditions, the reduction treatment is carried out in a ventilation type reducing furnace under a hydrogen atmosphere usually at from 350 to 600° C., and preferably from 425 to 530° C. usually for from 0.25 to 1 hour, and from 0.25 to 0.5 hours. Next, after displacing the atmosphere with nitrogen, heating is carried out usually at from 450 to 650° C., and preferably from 500 to 600° C. usually for from 0.5 to 3 hours, and preferably from 1 to 2 hours. Next, after displacing the atmosphere with hydrogen, the reduction treatment is carried out at the foregoing temperature for from 3 to 5 hours. It is very effective to carry out the reduction treatment by elevating gradually the temperature from a low temperature to a high temperature in a stepwise manner, for example, at from 350 to 470° C. at the beginning of the reduction, then from 370 to 620° C., and finally from 450 to 620° C. (and by elevating the temperature by 10° C. or more in each step) and repeating these treatments, thereby controlling the shape of the metal portion and enhancing the crystallinity.

The completion of the reduction is determined by measuring the water content in a drainage system gas by a dew point hygrometer. In the manufacturing process of the ferromagnetic metal powder, known processes such as processes described in JP-A-7-109122 and JP-A-6-340426 can be employed. As the ferromagnetic metal element of the metal portion of the ferromagnetic metal powder, ones containing Fe or Fe—Co as the major component are preferable. The major component as referred to herein means that its amount is 75% by weight or more based on the total weight of the metal portion. Co is especially preferable because it can increase the σs and form a minute and thin oxide film. The Co content of the ferromagnetic metal powder is preferably from 5 to 45 atomic %, and more preferably from 15 to 35% by weight based on Fe to be contained in the ferromagnetic metal powder. When the Co content of the ferromagnetic metal powder is less than 5 atomic %, it is difficult to control the coefficient of variation of oxide film thickness at not more than 20%. Also, according to the construction of the magnetic recording medium of the invention, it is difficult to make the demagnetization fall within 10%. On the other hand, when the Co content exceeds 45 atomic %, it is difficult to make the particle size distribution uniform. Also, it is difficult to control the reduction rate, whereby breakage of the particle or sintering between the particles takes place. As means for containing Co in the ferromagnetic metal powder, it is preferable that a part of Co is doped in the raw material such as a goethite, the remainder is adhered on the surface of the raw material by, for example, a sintering preventive treatment, followed by reduction to form an alloy. The Co content to be adhered on the raw material surface is preferably from 10 to 40 atomic %, and more preferably from 15 to 35 atomic % based on Fe to be contained in the ferromagnetic metal powder.

After completion of the reduction of the oxide, the metallized powder is subjected to a gradual oxidation treatment. The atmosphere for the gradual oxidation treatment is an oxygen-containing inert gas atmosphere. As the inert gas atmosphere, a nitrogen gas, a helium gas, an argon gas, and the like are preferable, with a nitrogen gas being especially suitable. The content of oxygen is preferably from 0.1 to 5% by volume, and it is preferred to increase the oxygen amount to a prescribed amount step by step. Also, as the inert gas atmosphere, water vapor may be contained. In the case where water vapor is contained, a spindle like alloy magnetic particulate powder having a high coercive force is liable to be obtained. The gradual oxidation temperature is preferably from 30 to 200° C., and more preferably from 30 to 180° C. In the case where the gradual oxidation temperature is lower than 30° C., it becomes difficult to form a surface oxide layer having a sufficient thickness, and a lowering of the magnetic characteristics by washing with water becomes remarkable. On the other hand, in the case where it exceeds 200° C., the shape of the particle varies, and especially, since a large amount of the oxide is formed, the minor axis expands excessively. As the case may be, the shape breakage is liable to occur, and therefore, such is not preferable.

After subjecting to the gradual oxidation treatment, a heating treatment, a reduction treatment, and a surface oxidation treatment (gradual oxidation treatment) may be repeatedly carried out. By repeating these treatments, it is possible to easily obtain a more minute ferromagnetic metal powder. Also, by washing with water after forming a ferromagnetic metal powder, a water-soluble salt present on the surface of the ferromagnetic metal powder can be removed, and therefore, such a treatment is carried out, if desired.

In the invention, the ferromagnetic metal powder may be used singly or in admixture of two or more kinds thereof.

Next, the magnetic recording medium of the invention will be described. In the magnetic recording medium of the invention, the weather resistance of the magnetic layer, that is, the storage stability of the magnetic recording medium resulting from controlling the demagnetization after storing at 60° C. and 90% RH for one week at not more than 10%, is in the problem-free level. However, it is preferable that the demagnetization is as low as possible. The demagnetization $\Delta\Phi m$ (%) of the magnetic layer means one as determined according to the following measurement method.

$$\Delta\Phi m(\%)=100\times[(\Phi m \text{ before storage})-(\Phi m \text{ after storage})]/(\Phi m \text{ after storage})$$

$\Phi m$: maximum magnetic flux

The measurement is carried out at a time constant of 0.1 seconds, a sweep rate of 3 min/10 kOe {Oe=(1/4π) kA/m} and a measurement magnetic field of 10 kOe using a vibrating sample magnetometer, VSM-5 (manufactured by Toei Industry Co., Ltd.). Also, an increase $\Delta Hc$ (%) of Hc is preferably within 2.5%. The $\Delta Hc$ (%) means one as determined according to the following measurement method.

$$\Delta Hc(\%)=100\times[(Hc \text{ before storage})-(Hc \text{ after storage})]/(Hc \text{ after storage})$$

The measurement is the same as in the measurement of $\Delta\Phi m$. When the $\Delta Hc$ (%) exceeds 2.5%, an increase of a high-Hc component or an increase of a low-Hc component occurs, and therefore, such is not preferable.

The residual magnetic flux ($\Phi r$) {[residual magnetic flux density (Br)]×[magnetic layer thickness ($\delta$)]} of the magnetic layer of the invention is preferably from 5 to 75 mT·µm, more preferably from 10 to 70 mT·µm, and especially preferably from 15 to 60 mT·µm. It is desired to set up the residual magnetic flux ($\Phi r$) of the magnetic layer at an optimum value depending upon the performance of the MR head. It is preferred to select a high value for the residual magnetic flux within the range where the MR head is not saturated.

In the invention, the Hc of the magnetic layer is preferably from 135 to 320 kA/m, more preferably from 150 to 300 kA/m, and especially preferably from 160 to 240 kA/m. When the Hc is less than 135 kA/m, the output is insufficient and the amount of the low-Hc component which is present becomes high, whereby a thermal fluctuation problem occurs. On the other hand, the Hc exceeding 320 kA/m is not preferable in view of the overwrite characteristics. Also, the recording current is insufficient, the head is saturated, a warp is generated, and the output is insufficient. Therefore, such is not preferable. Such a tendency is remarkable in a system using a head with high sensitivity, for example, a magnetoresistive (MR) head. When each of the Hc, Br and $\Phi r$ is less than the foregoing lower limit, there is some possibility that a short-wavelength output cannot be sufficiently obtained. On the other hand, when each of the Hc, Br and $\Phi r$ exceeds the foregoing upper limit, the head to be used for recording is saturated so that it may become impossible to secure an output.

The magnetic recording medium which is applied in the invention is a so-called coating type magnetic recording medium comprising a non-magnetic support having formed thereon a magnetic layer composed mainly of a ferromagnetic metal powder and a binder. As other constructive elements which construct the magnetic recording medium, any element which is used in a usual coating type magnetic recording medium can be used.

Basically, the layer construction of the magnetic recording medium of the invention is not particularly limited so far as at least a magnetic layer containing the ferromagnetic metal powder of the invention is provided on a non-magnetic support, the magnetic layer being provided in one side or both sides of the non-magnetic support. Also, the magnetic layer may be constructed of a single layer or two or more layers. In the latter case, the magnetic layers may be provided adjacent to each other, or may be provided via a layer other than a magnetic layer, and a known layer construction can be employed. In the case of multiple layers, the thickness of the magnetic layer as referred to in the invention means a dry thickness of the uppermost magnetic layer. The thickness of the magnetic layer is from 0.04 to 0.25 μm, preferably from 0.04 to 0.23 μm, and more preferably from 0.05 to 0.22 μm. In the magnetic recording medium of the invention, it is preferable that a non-magnetic layer composed mainly of a non-magnetic powder and a binder is provided between the non-magnetic support and the magnetic layer. In this case, the surface roughness of the magnetic layer is preferably not more than 3.0 nm, and more preferably from 1.0 to 2.8 nm in terms of center plane average surface roughness (Ra). As an example in which the magnetic layer is constructed of plural layers, there is enumerated a combination of magnetic layers in which a ferromagnetic powder selected from various ferromagnetic metal powders such as ferromagnetic iron oxide, ferromagnetic cobalt-modified iron oxide, a $CrO_2$ powder, and a hexagonal ferrite powder is dispersed in a binder. In this case, even when the ferromagnetic powder is the same kind, magnetic layers containing ferromagnetic powders having different element composition and powder size can be combined.

In the invention, a magnetic recording medium in which a non-magnetic layer is provided between the magnetic layer containing a ferromagnetic metal powder and the non-magnetic support is preferable. With respect to the position relationship of layers in such a layer construction, the magnetic layer may be referred to as an upper layer, and the non-magnetic layer may be referred to as a lower layer. Next, the detailed contents regarding the lower layer will be described. The lower layer is substantially non-magnetic and is preferably constructed of a non-magnetic powder and a binder. However, the lower layer should not be particularly limited. In the lower layer, a magnetic powder can be used within the range where the lower layer is substantially non-magnetic. What the lower layer is substantially non-magnetic means that it is tolerable that the lower layer is magnetic within the range where the magnetoelectric transform characteristics of the upper layer are not substantially lowered.

The non-magnetic powder can be selected from inorganic compounds such as metal oxides, metal carbonates, metal nitrides, and metal carbides. As the inorganic compound, for example, α-alumina having an α conversion rate of 90% or more, β-alumina, γ-alumina, θ-alumina, silicon carbide, chromium oxide, cerium oxide, α-iron oxide, a goethite, silicon nitride, titanium dioxide, silicon dioxide, tin oxide, magnesium oxide, zirconium oxide, zinc oxide, barium oxide, and the like can be used singly or in combinations. Of these, titanium dioxide, zinc oxide, α-iron oxide, and barium oxide are especially preferable because the particle size distribution is small, and there are many means for imparting a function. Titanium dioxide and α-iron oxide are the most preferable. As the α-iron oxide, ones prepared by heat dehydrating and annealing magnetic iron oxide having a uniform particle size or an iron oxide raw material for preparing a metal powder, thereby removing voids and optionally subjecting to a surface treatment are preferable. Usually, since titanium dioxide has photo-catalytic properties, there is some possibility that when it is irradiated with light, a radical is generated to react with a binder and a lubricant. For that reason, in the titanium dioxide to be used in the invention, it is necessary that Al, Fe, and the like are incorporated in an amount of from 1 to 10% as a solid solution, thereby lowering the photo-catalytic characteristics. Further, it is also preferred to treat the surface with an Al or Si compound, thereby lowering the catalytic action. The particle size of such a non-magnetic powder is preferably from 0.005 to 1 μm. If desired, non-magnetic powders having a different particle size can be combined. Also, even in a single non-magnetic powder, by broadening the particle size distribution, it is possible to bring the same effect.

The particle size of the non-magnetic powder is especially preferably from 0.01 μm to 0.5 μm. In particular, in the case where the non-magnetic powder is a particulate metal oxide, its circle-corresponding size is preferably not more than 0.08 μm; and in the case where the non-magnetic powder is an acicular metal oxide, its average major size is preferably not more than 0.3 μm, and more preferably not more than 0.2 μM. The tap density is usually from 0.3 to 1.5 g/mL, and preferably from 0.4 to 1.3 g/mL. The water content of the non-magnetic powder is usually from 0.2 to 5% by weight, preferably from 0.3 to 3% by weight, and more preferably from 0.3 to 1.5% by weight. The pH of the non-magnetic powder is usually from 2 to 12, and especially preferably from 5.5 to 11. The specific surface area as measured by the BET method ($S_{BET}$) of the non-magnetic powder is usually from 1 to 100 $m^2/g$, preferably from 5 to 80 $m^2/g$, and more preferably from 10 to 80 $m^2/g$. The crystallite size of the non-magnetic powder is preferably from 40 to 1,000 angstroms, and more preferably from 40 to 800 angstroms. The oil absorption using DBP (dibutyl phthalate) is usually from 5 to 100 mL/100 g, preferably from 10 to 80 mL/100 g, and more preferably from 20 to 60 mL/100 g. The specific gravity is usually from 1.5 to 7, and preferably from 3 to 6. The shape may be any acicular, spherical, polyhedral or tabular form. The adsorption amount of SA (stearic acid) of the non-magnetic powder is from 1 to 20 μmoles/$m^2$, preferably from 2 to 15 μmoles/$m^2$, and more preferably from 3 to 8 μmoles/$m^2$. When a non-magnetic powder having a high adsorption amount of stearic acid is used, it is preferable that the surface is modified with an organic material which firmly adsorbs on the surface to prepare a magnetic recording medium.

It is preferable that the surface of such a non-magnetic powder is subjected to a surface treatment with a compound containing an element such as Al, Mg, Si, Ti, Zr, Sn, Sb, Zn, and Y. As an oxide to be formed on the surface by this surface treatment, in particular, $Al_2O_3$, $SiO_2$, $TiO_2$, $ZrO_2$, MgO, and hydrated oxides thereof are preferable in view of dispersibility. Of these, $Al_2O_3$, $SiO_2$, $ZrO_2$, and hydrated oxides thereof are more preferable. These compounds may be used in combinations or singly. Also, a surface-treated layer resulting from co-precipitation may be used depending upon the purpose. There can be employed a method of first forming alumina and then forming silica on its surface layer or a reverse method thereof. Also, though the surface-treated layer may be made as a porous layer depending upon the purpose, it is generally preferable that the surface-treated layer is uniform and minute.

Specific examples of the non-magnetic powder to be in the lower layer include NANOTITE (manufactured by Show Denko K. K.), HIT-100 and HIT-82 (manufactured by Sumitomo Chemical Co., Ltd.), α-iron oxides DPN-250BX, DPN-245, DPN-270BX, DPN-550BX, DPN-550RX, DBN-650RX and DAN-850RX (manufactured by Toda Kogyo Corp.), titanium oxides TTO-51B, TTO-55A, TTO-55B, TTO-55C, TTO-55S, TTO-55D and SN-100 (manufactured by Ishihara Sangyo Kaisha, Ltd.), titanium oxides STT-4D, STT-30D, STT-30 and STT-65C, and α-iron oxide α-40 (manufactured by Titan Kogyo Kabushiki Kaisha), titanium oxides MT-100S, MT-100T, MT-150W, MT-500B, MT-600B, MT-100F and MT-500HD (manufactured by Tayka Corporation), FINEX-25, BF-1, BF-10, BF-20, and ST-M (manufactured by Sakai Chemical Industry Co., Ltd.), iron oxides DEFIC-Y and DEFIC-R (manufactured by Dowa Mining Co., Ltd.), AS2BM and $TiO_2$ P25 (manufactured by Nippon Aerosil Co., Ltd.), 100A and 500A (manufactured by Ube Industries, Ltd.), and calcined products thereof.

As well known, by mixing carbon black in the lower layer, it is possible to lower the surface electrical resistance Rs, to reduce the light transmittance and to obtain a desired micro Vickers hardness. In the invention, the carbon black to be used in the lower layer may be contained as the foregoing non-magnetic powder. Also, by containing carbon black in the lower layer, it is possible to bring a lubricant storage effect. Examples of the type of the carbon black which can be suitably used include various furnace blacks for rubber, various thermal blacks for rubber, carbon black for coloring, conductive carbon black, and acetylene black. The carbon black to be used in the lower layer should have characteristics that have been optimized as follows according to the desired effect, and the effect can be increased by the combined use thereof.

The carbon black to be used in the lower layer usually has a specific surface area as measured by the BET method of from 50 to 500 $m^2/g$, and preferably from 70 to 400 $m^2/g$ and usually has a DBP oil absorption of from 20 to 400 mL/100 g, and preferably from 30 to 400 mL/100 g. The mean particle size of carbon black is usually from 5 to 80 nm, preferably from 10 to 50 nm, and more preferably from 10 to 40 nm. The carbon black preferably has a pH of from 2 to 10, a water content of from 0.1 to 10% by weight, and a tap density of from 0.1 to 1 g/mL. Specific examples of the carbon black which is used in the invention include BLACKPEARLS 2000, 1300, 1000, 900, 800, 880 and 700 (manufactured by Cabot Corporation), XC-72 (manufactured by VULCAN), #3050B, #3150B, #3750B, #3950B, #950, #650B, #970B, #850B, MA-600, MA-230, #4000 and #4010 (manufactured by Mitsubishi Chemical Corporation), CONDUCTEX SC, RAVEN 8800, 8000, 7000, 5750, 5250, 3500, 2100, 2000, 1800, 1500, 1255 and 1250 (manufactured by Columbia Carbon Co.), and Ketjen Black EC (manufactured by AKZO NOBEL). The carbon black may be subjected to a surface treatment with a dispersant, etc., grafting with a resin, or partial surface graphitization. Also, the carbon black may be dispersed with a binder in advance prior to addition to a coating material. The carbon black can be used in the range not exceeding 50% by weight based on the foregoing non-magnetic powder and in the range not exceeding 40% by weight of the total weight of the lower layer. The carbon black can be used singly or in combinations. The carbon black which can be used in the invention can be selected while referring to, for example, *Carbon Black Handbook* (edited by the Carbon Black Association of Japan).

Also, an organic powder can be added in the lower layer according to the purpose. Examples of the organic powder include an acrylic styrene based resin powder, a benzoguanamine resin powder, a melamine based resin powder, and a phthalocyanine based pigment. Also, a polyolefin based resin powder, a polyester based resin powder, a polyamide based powder, a polyimide based resin powder, and a polyethylene fluoride powder can be used. As the production process, ones described in, for example, JP-A-62-18564 and JP-A-60-255827 can be employed.

With respect to a binder (type and amount), the amounts and types of a lubricant, a dispersant and an additive, and a solvent to be used in the lower layer and the dispersion method, known technologies regarding the upper layer can be applied.

As the binder to be used in the magnetic layer or further in the non-magnetic layer in the magnetic recording medium of the invention, conventionally known thermoplastic resins, thermosetting resins and reactive resins, and mixtures thereof can be used. As the thermoplastic resin, ones having a glass transition temperature of from −100 to 150° C., a number average molecular weight of from 1,000 to 200,000, and preferably from 10,000 to 100,000, and a degree of polymerization of from about 50 to 1,000 are preferably used.

Examples of such a binder include polymers or copolymers containing, as a constitutional unit, vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, vinyl ether, etc, polyurethane resins, and various rubber based resins.

Also, examples of the thermosetting resin or reactive resin include phenol resins, epoxy resins, curable polyurethane resins, urea resins, melamine resins, alkyd resins, reactive acrylic resins, formaldehyde resins, silicone resins, epoxypolyamide resins, mixtures of a polyester resin and an isocyanate prepolymer, mixtures of a polyester polyol and a polyisocyanate, and mixtures of a polyurethane and a polyisocyanate.

For the purpose of obtaining more excellent dispersion effect of the ferromagnetic powder and durability of the magnetic layer, if desired, the foregoing binder may be suitably incorporated with at least one polar group selected from —COOM, —$SO_3M$, —$OSO_3M$, —P=O(OM)$_2$, —O—P=O(OM)$_2$ (wherein M represents a hydrogen atom or an alkali metal), —OH, —$NR_2$, —$N^+R_3$ (wherein R represents a hydrocarbon group), an epoxy group, SH, and CN by copolymerization or addition reaction. The amount of such a polar group is from $10^{-1}$ to $10^{-8}$ moles/g, and preferably from $10^{-2}$ to $10^{-6}$ moles/g based on the amount of the binder.

The binder which is used in the magnetic recording medium of the invention is used in an amount in the range of from 5 to 50% by weight, and preferably from 10 to 30% by weight based on the ferromagnetic powder. In the case of using a vinyl chloride based resin, the amount thereof is from 5 to 100% by weight; in the case of using a polyurethane resin, the amount thereof is from 0 to 100% by weight; and in the case of using a polyisocyanate, the amount thereof is from 2 to 100% by weight. They are preferably used in combinations.

In the invention, in the case of using a polyurethane, its glass transition temperature is from −50 to 100° C., its elongation at break is from 100 to 2,000%, its breaking stress is usually from 0.05 to 10 kg/mm² (≅from 0.49 to 98 MPa), and its yield point is preferably from 0.05 to 10 kg/mm² (≅from 0.49 to 98 MPa).

Examples of the polyisocyanate to be used in the invention include isocyanates (for example, tolylene diisocyanate, 4,4'-diphenylmethane diisocyanate (MDI), hexamethylene diisocyanate, xylylene diisocyanate, naphthylene-1,5-diisocyanate, o-toluidine diisocyanate, isophorone diisocyanate, and triphenylmethane triisocyanate), reaction products between such an isocyanate and a polyalcohol, and polyisocyanates formed by condensation of an isocyanate. These isocyanates are commercially available under the trade names of CORONATE L, CORONATE HL, CORONATE 2030, CORONATE 2031, MILLIONATE MR AND MIL- LIONATE MTL (manufactured by Nippon Polyurethane Industry Co., Ltd.), TAKENATE D-102, TAKENATE D-110N, TAKENATE D-200 AND TAKENATE D-202 (manufactured by Takeda Chemical Industries, Ltd.), and DESMODUR L, DESMODUR IL, DESMODUR N AND DESMODUR HL (manufactured by Sumitomo Bayer Urethane Co., Ltd.). These isocyanates can be used singly or in combinations of two or more kinds thereof while utilizing a difference in curing reactivity.

In general, raw materials having various functions including a lubricant, an abrasive, a dispersant, an antistatic agent, a plasticizer, and an antiseptic can be contained in the magnetic layer and/or the non-magnetic layer of the magnetic recording medium of the invention according to the purpose.

Examples of the lubricant which can be used include silicone oils such as dialkylpolysiloxanes (the alkyl moiety thereof has from 1 to 5 carbon atoms), dialkoxypolysiloxanes (the alkoxy moiety thereof has from 1 to 4 carbon atoms), monoalkylmonoalkoxypolysiloxanes (the alkyl moiety thereof has from 1 to 5 carbon atoms, and the alkoxy moiety thereof has from 1 to 4 carbon atoms), phenylpolysiloxanes, and fluoro-alkylpolysiloxanes (the alkyl moiety thereof has from 1 to 5 carbon atoms); conductive fine powders such as graphite; inorganic powders such as molybdenum disulfide and tungsten disulfide; plastic fine powders such as polyethylene, polypropylene, polyethylene-vinyl chloride copolymers, and polytetrafluoroethylene; α-olefin polymers; saturated fatty acids which are solid at the ambient temperature (having from 10 to 22 carbon atoms); unsaturated aliphatic hydrocarbons which are liquid at the ambient temperature (compounds in which an n-olefin double bond is bonded to terminal carbon and having about 20 carbon atoms); fatty acid esters comprising a monobasic fatty acid having from 12 to 20 carbon atoms and a monohydric alcohol having from 3 to 12 carbon atoms; and fluorocarbons.

Of these, saturated fatty acids and fatty acid esters are preferable, and combinations thereof are more preferable. Examples of the saturated fatty acid include lauric acid, myristic acid, stearic acid, palmitic acid, behenic acid, and arachic acid. Examples of an alcohol which is the raw material of the fatty acid ester include monohydric alcohols (for example, ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether, and sec-butyl alcohol) and polyhydric alcohols (for example, ethylene glycol, diethylene glycol, neopentyl glycol, glycerin, and sorbitan derivatives). Examples of a fatty acid which is also the raw material of the fatty acid ester include aliphatic carboxylic acids (for example, acetic acid, propionic acid, octanoic acid, 2-ethylhexanoic acid, lauric acid, myristic acid, stearic acid, palmitic acid, behenic acid, arachic acid, oleic acid, linolic acid, linoleic acid, elaidic acid, and palmitoleic acid) and mixtures thereof.

Specific examples of the fatty acid ester include various ester compounds such as butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, butylethyl stearate, 2-butoxy-1-propyl stearate, an ester prepared by esterifying dipropylene glycol monobutyl ether with stearic acid, diethylene glycol dipalmitate, a diester prepared by esterifying hexamethylenediol with myristic acid, and an oleate of glycerin.

Further, for the purpose of reducing hydrolysis of a fatty acid ester often formed when the magnetic recording medium is used at a high humidity, it is also preferred to select the branched/linear or cis-/trans-isomeric structure or branching position of the starting fatty acid and alcohol. The lubricant is added in an amount in the range of from 0.2 to 20 parts by weight based on 100 parts by weight of the binder.

The following compounds can also be used as the lubricant. Examples thereof include silicone oils, graphite, molybdenum disulfide, boron nitride, fluorinated graphite, fluoroalcohols, polyolefins, polyglycols, alkyl phosphates, and tungsten disulfide.

Examples of the abrasive which is used in the magnetic layer of the invention include generally used abrasives such as α-alumina, γ-alumina, fused alumina, corundum, artificial corundum, silicon carbide, chromium oxide ($Cr_2O_3$), diamond, artificial diamond, garnet, emery (major components: corundum and magnetite), and α-$Fe_2O_3$. These abrasives have a Mohs hardness of 6 or more. Specific examples thereof include AKP-10, AKP-12, AKP-15, AKP-20, AKP-30, AKP-50, AKP-1520, AKP-1500, HIT-50, HIT60A, HIT70, HIT80 AND HIT-100 (manufactured by Sumitomo Chemical Co., Ltd.), G5, G7, S-1 and chromium oxide K (manufactured by Nippon Chemical Industry Co., Ltd.), UB40B (manufactured by Uyemura & Co., Ltd.), WA8000 and WA10000 (manufactured by Fujimi Incorporated), and TF100, TF140 and TF180 (manufactured by Toda Kogyo Corp.), Abrasives having an average powder size of from 0.05 to 3 μl, and preferably from 0.05 to 1.0 μm are effective.

The abrasive is added in the total amount of from 1 to 20 parts by weight, and desirably from 1 to 15 parts by weight based on 100 parts by weight of the magnetic body. When the addition amount of the abrasive is less than 1 part by weight, sufficient durability tends to be not obtained. On the other hand, when it exceeds 20 parts by weight, the surface properties and degree of filling tend to be deteriorated. The abrasive may be subjected to a dispersion treatment with a binder in advance and then added in the magnetic coating material.

In addition to the foregoing non-magnetic powder, a conductive particle can be contained as an antistatic agent in the magnetic layer of the magnetic recording medium of the invention. In the magnetic recording medium comprising a non-magnetic layer provided between a non-magnetic support and a magnetic layer, for the purpose of increasing the saturated magnetic flux density of the upper layer at maximum, it is preferable that the antistatic agent is added in the upper layer in a low amount as far as possible and added in other coating layer than the upper layer. As the antistatic agent, the addition of carbon black is especially preferable from the standpoint of lowering the surface electrical resistance of the whole of the medium. Examples of the carbon black which can be added include various furnace blacks for rubber, various thermal blacks for rubber, carbon black for coloring, conductive carbon black, and acetylene black. The carbon black preferably has an SBET of from 50 to 500 $m^2/g$, a DBP oil absorption of from 10 to 1,500 mL/100 g, a mean particle size of from 5 to 300 nm, a pH of from 2 to 10, a water content of from 0.1 to 10% by weight, and a tap density of from 0.1 to 1 g/mL. Specific examples of the carbon black which is used in the invention include BLACKPEARLS 2000, 1300, 1000, 900, 800 and 700 and VUCAN XC-72 (manufactured by Cabot Corporation), #80, #60, #55, #50 and #35 (manufactured by Asahi Carbon Co., Ltd.), #3950B, #2700, #2650, #2600, #2400B, #2300, #900, #1000, #95, #30, #40, #10B, MA230, MA220 and MA77

(manufactured by Mitsubishi Chemical Corporation), CONDUCTEX SC, RAVEN 150, 50, 40 and 15 (manufactured by Columbia Carbon Co.), and Ket en Black EC, Ketjen Black ECDJ-500 and Ketjen Black ECDJ-600 (manufactured by LION AKZO Co., Ltd.). The carbon black may be subjected to a surface treatment with a dispersant, etc., an oxidation treatment, grafting with a resin, or partial surface graphitization. Also, the carbon black may be dispersed with a binder in advance prior to addition to a magnetic coating material. In the case where the carbon black is used in the magnetic layer, the carbon black is preferably used in an amount of from 0.1 to 30% by weight based on the magnetic body. It is preferable that in the non-magnetic layer, the carbon black is contained in an amount of from 3 to 20% based on the inorganic non-magnetic powder (provided that the carbon black is not included in the non-magnetic powder).

In general, the carbon black not only works as an antistatic agent but also functions to reducing the coefficient of friction, imparting light-shielding properties and enhancing the film strength. Carbon black having properties suitable for such functions is selected. Accordingly, as a matter of course, it is possible to appropriately choose and use the type, the amount and the combination of the carbon black to be used in the invention based on the foregoing various characteristics such as powder size, oil absorption, conductivity, and pH according to the purpose. With respect to the carbon black which can be used, for example, *Carbon Black Handbook* (edited by the Carbon Black Association of Japan) can be referred to.

In the case where the magnetic recording medium of the invention is one in which two or more coating layers are formed on a non-magnetic support, examples of the formation means include a sequential coating mode (wet-on-dry mode) and a simultaneous coating mode (wet-on-wet mode). The latter is especially excellent because it is possible to prepare an ultra-thin magnetic layer. Specific examples of the simultaneous coating mode, that is, the wet-on-wet mode are as follows.

(1) A method in which a magnetic coating material is first coated as a lower layer using a generally used gravure coating, roll coating, blade coating or extrusion coating unit, and an upper layer is then coated in the state that the lower layer is still wet using a pressurized support type extrusion coating unit as disclosed in, for example, JP-B-1-46186, JP-A-60-238179, and JP-A-2-265672.

(2) A method in which a coating liquid for lower layer and a coating liquid for upper layer are substantially simultaneously coated using a coating head equipped with two slits for feeding a coating liquid as disclosed in JP-A-63-88080, JP-A-2-17971, and JP-A-2-265672.

(3) A method in which an upper layer and a lower layer are substantially simultaneously coated using an extrusion coating unit equipped with a backup roll as disclosed in JP-A-2-174965.

In the case of coating in the wet-on-wet mode, it is preferable that the fluidity characteristics between the coating liquid for magnetic layer and the coating liquid for non-magnetic layer are as close as possible. This is because a magnetic layer having a uniform thickness and a less fluctuation of thickness can be obtained without causing disorder of the interface between the magnetic layer and non-magneticlayer as coated. Since the fluidity characteristics of the coating liquid strongly depend upon a combination of the powder and the binder in the coating liquid, in particular, it is important to pay attention to selection of the non-magnetic powder to be used in the non-magnetic layer.

The thickness of the non-magnetic support of the magnetic recording medium of the invention is usually from 1 to 100 μm. When the magnetic recording medium is used in the tape form, the thickness of the non-magnetic support is desirably from 3 to 20 μm; and when used as a flexible disk, it is preferably from 40 to 80 μm. The thickness of the non-magnetic layer to be provided on the non-magnetic support is usually from 0.5 to 10 μm, and preferably from 0.5 to 3 μm.

Also, in addition to the foregoing magnetic layer and non-magnetic layer, other layers may be formed according to the purpose. For example, an undercoat layer may be provided between the non-magnetic support and the lower layer for the purpose of enhancing the adhesiveness. The thickness of the undercoat layer is usually from 0.01 to 2 μm, and preferably from 0.05 to 0.5 μm. Also, a back layer may be provided in the opposite side to the magnetic layer side of the non-magnetic support. The thickness of the back layer is usually from 0.1 to 2 μm, and preferably from 0.3 to 1.0 μm. As the undercoat layer and back layer, known layers can be used. In the case of a disk-like magnetic recording medium, layers having the foregoing layer constructions can be provided on one face or both faces thereof.

The non-magnetic support to be used in the invention is not particularly limited, but usually used supports can be used. Examples of the raw material for forming the non-magnetic support include films of various synthetic resins such as polyethylene terephthalate, polyethylene, polypropylene, polycarbonates, polyethylene naphthalate, polyamides, polyamide-imides, polyimides, polysulfones, and polyether sulfones; and metallic foils such as an aluminum foil and a stainless steel foil.

For the purpose of effectively achieving the object of the invention, the surface roughness of the non-magnetic support is not more than 0.03 μm, desirably not more than 0.02 μm, and more desirably not more than 0.01 μm in terms of central plane average surface roughness (Ra) (cutoff value: 0.25 mm). Also, it is preferable that not only the non-magnetic support is small in the foregoing center plane average surface roughness, but also it is free from coarse protrusions of 1 μm or more. Also, the surface roughness profile can be freely controlled by the size and amount of a filler to be optionally added in the non-magnetic support. Examples of the filler include acrylic organic resin fine powders as well as oxides or carbonates of Ca, Si, Ti, etc. The non-magnetic support to be used in the invention preferably has an F-5 value in the web running direction of from 5 to 50 kg/mm² (≅from 49 to 490 MPa) and an F-5 value in the web width direction of from 3 to 30 kg/mm² (≅from 29.4 to 294 MPa). Though in general, the F-5 value in the web longitudinal direction is higher than the F-5 value in the web width direction, when it is especially required to increase the strength in the width direction, it should not be construed that the invention is limited thereto.

Also, the thermal shrinkage of the non-magnetic support at 100° C. for 30 minutes in each of the web running direction and the width direction is preferably not more than 3%, and more preferably not more than 1.5%; and the thermal shrinkage at 80° C. for 30 minutes is preferably not more than 1%, and more preferably not more than 0.5%. Its breaking strength is desirably from 5 to 100 kg/mm² (≅from 49 to 980 MPa), and its elastic modulus is desirably from 100 to 2,000 kg/mm² (≅from 0.98 to 19.8 GPa).

Examples of an organic solvent which is used in the invention include ketones (for example, acetone, methyl ethyl ketone, methyl isobutyl ketone, diisobutyl ketone, cyclohexanone, isophorone, and tetrahydrofuran), alcohols (for example, methanol, ethanol, propanol, butanol, isobutyl alcohol, isopropyl alcohol, and methylcyclohexanol), esters (for example, methyl acetate, butyl acetate, isobutyl acetate, isopropyl acetate, ethyl lactate, and glycol acetate), glycol ethers (for example, glycol dimethyl ether, glycol monoethyl ether, and dioxane), aromatic hydrocarbons (for example, benzene, toluene, xylene, cresol, and chlorobenzene) chlorinated hydrocarbons (for example, methylene chloride, ethylene chloride, carbon tetrachloride, chloroform, ethylene chlorohydrin, and dichlorobenzene), N,N-dimethylformamide, and hexane. These solvents may be used singly or as a mixture with an arbitrary mixing ratio. The organic solvent is not always required to have a purity of 100% but may contain impurities such as isomers, unreacted materials, side-reaction products, decomposition products, oxides, and water in addition to the major component. The proportion of such impurities is preferably not more than 30%, and more preferably not more than 10%. The organic solvent which is used in the invention may be changed with respect to the kind and amount between the magnetic layer and the non-magnetic layer, if desired. For example, a highly volatile solvent can be used in the non-magnetic layer, thereby enhancing the surface properties; a solvent having a high surface tension (for example, cyclohexanone and dioxane) can be used in the non-magnetic layer, thereby enhancing the coating stability; or a solvent having a high solubility parameter can be used in the magnetic layer, thereby increasing the degree of filling. As a matter of course, it should not be construed that the invention is limited thereto.

The magnetic recording medium of the invention is obtained by kneading and dispersing the non-magnetic powder or the ferromagnetic powder and the binder and optionally, other additives using the organic solvent; coating the non-magnetic coating material and the magnetic coating material on the non-magnetic support; optionally orienting; and then drying.

The steps of manufacturing the magnetic coating material of the magnetic recording material of the invention include at least a kneading step and a dispersion step, and a mixing step which is optionally provided before and after these steps. Each of these steps may be divided into two or more stages. All of the raw materials to be used in the invention, such as the non-magnetic powder, the ferromagnetic powder, the binder, the carbon black, the abrasive, the antistatic agent, the lubricant, and the solvent may be added at the beginning or in the way of any of these steps. Also, the respective raw materials may be added dividedly in two or more steps. For example, polyurethane may be thrown dividedly in the kneading step, the dispersion step, and the mixing step for adjusting the viscosity after the dispersion.

In kneading and dispersing the non-magnetic coating material and the magnetic coating material, various kneading machines are used. Examples thereof include a twin-roll mill, a triple-roll mill, a ball mill, a pebble mill, a throne mill, a sand mill, a Szegvari attritor, a high-speed impeller dispersing machine, a high-speed stone mill, a high-speed impact mill, a dispersing machine, a kneader, a high-speed mixer, a homogenizer, and an ultrasonic dispersing machine.

For the purpose of achieving the object of the invention, as a matter of course, conventionally known manufacturing technologies can be employed as a part of the steps. In the kneading step, it is preferable to use a powerful kneading machine such as a continuous kneader and a pressure kneader. In the case of using a continuous kneader or a pressure kneader, all or a part of the ferromagnetic powder and the binder (preferably 30% by weight or more of the entire binder) are kneaded with from 15 to 500 parts by weight, based on 100 parts by weight of the ferromagnetic powder, of the solvent and other additive components. Details of the kneading treatment are described in JP-A-1-106338 and JP-A-64-79274. In the invention, the magnetic recording medium can be efficiently produced by employing the simultaneous double jet coating mode as described in JP-A-62-212933.

The amount of the residual solvent to be contained in the magnetic layer of the magnetic recording medium of the invention is preferably not more than 100 mg/m$^2$, and more preferably not more than 10 mg/m$^2$. It is preferable that the amount of the residual solvent to be contained in the magnetic layer is smaller than that of the residual solvent to be contained in the non-magnetic layer.

The porosity is preferably not more than 30% by volume, and more preferably not more than 10% by volume in both the lower layer and the upper layer. Though it is preferable that the porosity of the non-magnetic layer is larger than the porosity of the magnetic layer, so far as the porosity of the non-magnetic layer is 5% by volume or more, the porosity of the non-magnetic layer may be smaller than that of the magnetic layer.

Though the magnetic recording medium of the invention can have the lower layer and the upper layer, it is possible to change the physical properties between the lower layer and the upper layer according to the purpose. For example, it may be considered that by increasing the elastic modulus of the upper layer to enhance the running durability and simultaneously making the elastic modulus of the lower layer lower than that of the magnetic layer, touch of the magnetic recording medium with a head is improved.

By such a method, the magnetic layer as coated on the non-magnetic support is subjected to orientation of the ferromagnetic powder in the layer, if desired, followed by drying the formed magnetic layer. Also, if desired, the resulting magnetic layer is subjected to surface smoothening processing or cut into a desired shape, thereby producing the magnetic recording medium of the invention.

An elastic modulus at an elongation of 5% of the magnetic layer is desirably from 100 to 2,000 kg/mm$^2$ ($\cong$ from 980 to 19,600 N/mm$^2$) in both the web coating direction and the width direction; and its breaking strength is preferably from 10 to 70 kg/mm$^2$ ($\cong$ from 98 to 686 N/mm$^2$). An elastic modulus of the magnetic recording medium is preferably from 100 to 1,500 kg/mm$^2$ ($\cong$ from 980 to 14,700 N/mm$^2$) in each of the directions within the plane; its residual elongation is preferably not more than 0.5%; and its thermal shrinkage at any temperature of not higher than 100° C. is preferably not more than 1%, more preferably not more than 0.5%, and most preferably not more than 0.1%.

Though the magnetic recording medium of the invention may be a tape for video applications or audio applications or a floppy disk or magnetic disk for data recording applications, it is especially effective as a medium for digital recording applications, in which deficiency of signals due to the generation of dropout becomes fatal. Further, it is possible to a large-capacity magnetic recording medium having high magnetoelectric transform characteristics and excellent overwrite characteristics and having a high density by making the lower layer as the non-magnetic layer and adjusting the thickness of the magnetic layer on the lower layer at not more than 0.25 μm.

[Magnetic Recording and Reproducing Method]

The magnetic recording and reproducing method of the invention is characterized by reproducing signals recorded on a magnetic recording medium comprising a non-magnetic support having thereon at least one magnetic layer containing a ferromagnetic metal powder and a binder, wherein the ferromagnetic metal powder to be contained in the magnetic layer has an average long axis length of from 30 nm to 55 nm, a coefficient of variation of long axis length of not more than 25%, a coefficient of variation of axial ratio of not more than 20%, and a coefficient of variation of oxide film thickness of not more than 15% at a maximum linear recording density of 140 KFCI or more using an MR head. That is, the recording and reproducing method of the invention comprises reproducing signals recorded on the magnetic recording medium of the invention at a maximum linear recording density of 140 KFCI or more using a magnetoresistive head (MR head).

The MR head utilizes a magnetoresistive effect which is responsible to the size of a magnetic flux into a thin film magnetic head and has an advantage such that a high reproducing output which is not obtained by an induction type head is obtained. This is mainly caused due to the matter that since the reproducing output of the MR head is based on the change of the magnetic resistance, it does not rely upon a relative speed between the disk and the head, and a high output is obtained as compared with an induction type magnetic head. By using such an MR head as a reproducing head, excellent reproducing characteristics in a high-frequency region are obtained.

In the case where the magnetic recording medium of the invention is a magnetic recording medium in the tape form, by using the MR head as a reproducing head, it becomes possible to reproduce even signals as recorded in a high-frequency region at a high C/N as compared with the conventional technologies. Accordingly, the magnetic recording medium of the invention is optimum as a magnetic tape or a magnetic recording medium in the disk form for computer data recording for higher density recording.

EXAMPLES

Novel characteristics of the invention will be specifically described with reference to the following Examples, but it should not be construed that the invention is limited thereto.

Preparation of Ferromagnetic Metal Powder:

Preparation of Goethite Particulate Powder

Example 1

30 L of a mixed alkaline aqueous solution containing 30 moles of ammonium hydrogencarbonate and 50 moles of ammonia water was thrown into a stirrer-equipped reactor provided with a bubble dispersing blade, and a nitrogen gas was passed therethrough at a flow rate of 40 L/min while rotating the stirrer at 300 rpm, thereby adjusting the temperature of the mixture at 40° C. 16 L of a ferrous sulfate aqueous solution containing 18 moles of $Fe^{2+}$ was thrown into the reactor while continuing the stirring, and the mixture was ripened for 30 minutes while keeping the temperature at 35° C. Thereafter, 4 L of a cobalt sulfate aqueous solution containing 4.8 moles of $Co^{2+}$ was added, and the mixture was further ripened for 3.5 hours. Thereafter, while keeping the temperature of the reaction solution at 35° C., reaction was carried out while passing 1 L/min of air therethrough until 30% of entire $Fe^{2+}$ was oxidized. Next, 1 L of an aluminum sulfate aqueous solution containing 0.6 moles of $Al^{3+}$ was added, and reaction was carried out at a temperature of 40° C. while passing 1 L/min of air therethrough until 100% of $Fe^{2+}$ was oxidized. At the time of completion of the reaction, the pH was 8.0.

The resulting goethite particle-containing slurry was transferred into a stirrer-equipped tank, to which was then added 100 L of distilled water. The pH of the reaction solution was adjusted at 6.5 using dilute sulfuric acid, and the mixture was stirred at 400 rpm for 10 minutes. After allowing the reaction solution to stand for 10 hours, 70 L of partially suspended water was discharged from the upper portion of the water surface, filtered using a press filter, and further washed with ion exchanged water to form a press cake.

A part of the cake was dried and pulverized according to the customary manner. The resulting spindle like goethite particulate powder was in the spindle form, was uniform in the particle size, and was free from branched particles. This spindle like goethite particulate powder had an average long axis size of 0.081 μm, an average minor axis size of 0.011 μm, an axial ratio of 7.0, a BET specific surface area value of 187 m$^2$/g, a Co content as the whole of the particles of 24 atomic % based on entire Fe, and an Al content of 5.1 atomic % based on entire Fe.

Preparation of Spindle-Like Hematite Particulate Powder

The thus obtained press cake of the spindle-like goethite particulate powder was suspended in water, thoroughly dispersed by a sand grinder treatment using a pump, and adjusted so as to have a slurry concentration of 1%. An aqueous ammonia solution was added with stirring, thereby adjusting the pH of the resulting aqueous solution at 8.8. Next, an yttrium nitrate aqueous solution (12 atomic % based on entire Fe) was added and mixed with stirring, to which was then added an aqueous ammonia solution, thereby adjusting the pH of the suspension at 8.8. After stirring at 400 rpm for 10 minutes, the reaction mixture was allowed to stand for 10 hours. Thereafter, 100 L of partially suspended water was discharged from the upper portion of the water surface, filtered using a press filter, and further washed with ion exchanged water to form a press cake. Thereafter, the cake was filtered by a filter press and washed with water, thereby obtaining a press cake. The thus obtained press cake was subjected to extrusion molding by a molding plate having a pore size of 3 mm using an extrusion molding machine, granulated, and then dried at 120° C.

The granulated product of the spindle-like goethite particulate powder was dehydrated in air at 350° C. and then heated for dehydration in the same atmosphere at 600° C., thereby obtaining a granulated product of a spindle-like hematite particulate powder.

Preparation of Metal Magnetic Particulate Powder Composed Mainly of Iron

The thus obtained granular granulated product of spindle-like hematite particulate powder was charged into a batch type fixed layer reducing unit. After adjusting the layer height at about 5 cm, the temperature was elevated to 470° C. while passing a nitrogen gas at 500° C. at a gas spacial velocity of 50 cm/sec. Next, the nitrogen gas was switched into a hydrogen gas at 490° C., reduction under heating was carried out while passing the hydrogen gas therethrough at a gas spacial velocity of 50 cm/sec until the temperature within the reactor reached 490° C., and the dew point of the wasted hydrogen gas reached −45° C., thereby obtaining a granulated product of the metal magnetic particulate powder composed mainly of iron.

Thereafter, the hydrogen gas was again switched into a nitrogen gas, and the temperature was decreased to 50° C. Next, air was mixed such that the oxygen concentration was 0.15% by volume, thereby initiating gradual oxidation, and the oxygen concentration was increased to 1.0% by volume step by step. At this time, a surface oxidation treatment was carried out such that the product temperature did not exceed 40° C., thereby forming a surface oxide layer on the particle surface. There was thus obtained a granulated product of a metal magnetic particle composed mainly of iron.

The metal magnetic powder (sample 1) composed mainly of iron as thus obtained herein was comprised of a particle having an average long axis size of 0.048 μm, an axial ratio of 4.2, and a BET specific surface area value of 60.5 m$^2$/g, was in the spindle form, was uniform in the particle size, and was free from branched particles. Also, this metal magnetic powder had a Co content in the particle of 24 atomic % based on entire Fe, an Al content of 5 atomic % based on entire Fe, and a Y content of 12 atomic %.

Also, with respect to the magnetic characteristics of the metal magnetic particulate powder composed mainly of iron, its coercive force Hc was 185 kA/m, and its saturation magnetization value as σs 115 Am$^2$/kg.

Examples 2 to 5

Goethites having a spindle shape were obtained by carrying out a sintering preventive treatment in the same manner as in Example 1, except that in the preparation of Example 1, the goethite was replaced by each of samples having an average long axis length, an average minor axis length and an average axial ratio as shown in the following Table 1. Using each of the obtained spindle-like goethites, ferromagnetic metal powders (samples 2 to 5) were obtained in the same manner as in Example 1.

TABLE 1

| | Goethite | | |
|---|---|---|---|
| | Long axis length Average value (nm) | Minor axis length Average value (nm) | Axial ratio |
| Example 2 | 80 | 10.2 | 7.4 |
| Example 3 | 73 | 11 | 7.0 |
| Example 4 | 89.7 | 11.1 | 8.2 |
| Example 5 | 83 | 10.6 | 7.7 |

Comparative Example 1

A ferromagnetic metal powder (sample 6) was obtained in the same manner as in Example 4, except that in the preparation of Example 4, the dehydration temperature in air at the time of the hematite preparation was changed to 250° C.

Comparative Example 2

A ferromagnetic metal powder (sample 7) was obtained in the same manner as in Example 1, except that in the preparation of Example 1, the product temperature at the time of the gradual oxidation treatment was changed to 50° C.

Comparative Example 3

A ferromagnetic metal powder (sample 8) was obtained by carrying out a gradual oxidation treatment in the same manner as in Example 3, except that in the preparation of Example 3, the product temperature at the time of the gradual oxidation treatment was controlled such that it did not exceed 80° C.

Comparative Examples 4 to 5

Goethites having a spindle shape were obtained by carrying out a sinLering preventive treatment in the same manner as in Example 1, except that in the preparation of Example 1, the goethite was replaced by each of samples having an average long axis length, an average minor axis length and an average axial ratio as shown in the following Table 2. Using each of the obtained spindle-like goethites, ferromagnetic metal powders (samples 9 to 10) were obtained in the same manner as in Example 1.

TABLE 2

| | Goethite | | |
|---|---|---|---|
| | Long axis length Average value (nm) | Minor axis length Average value (nm) | Axial ratio |
| Comparative Example 4 | 68.2 | 10.1 | 6.9 |
| Comparative Example 5 | 141 | 11.5 | 7.6 |

Pictures of the obtained ferromagnetic metal powders were taken by a high resolution transmission electron microscope, and with respect to the 500 particles thereof, the ferromagnetic metal powder was measured with respect to the long axis length, the minor axis length, the axial ratio, and the oxide film thickness. From the obtained data, the average long axis length and coefficient of variation thereof, the average axial ratio and coefficient of variation thereof, and the average oxide film thickness and coefficient of variation thereof of the ferromagnetic metal powder were calculated. The obtained values are shown in Table 3.

Preparation of Magnetic Recording Medium

Examples 1 to 5 and Comparative Examples 1 to 5

For the purpose of a magnetic tape using the foregoing ferromagnetic metal powder, the following composition of a magnetic layer, the following composition of a non-magnetic layer for lower layer, and the following composition of a back layer were prepared.

1. Preparation of Coating Liquid for Magnetic Layer:

| | |
|---|---|
| Ferromagnetic acicular metal powder (Samples 1 to 10) | 100 parts |
| Polyurethane resin Branched side chain-containing polyester polyol/diphenylmethane diisocyanate based resin, containing 70 eg/ton of —SO$_3$Na as a hydrophilic polar group | 15 parts |

-continued

| | |
|---|---|
| Phenylphosphonic acid | 4 parts |
| α-Al$_2$O$_3$ (particle size: 0.06 μm) | 2 parts |
| Carbon black (particle size: 20 nm) | 2 parts |
| Cyclohexanone | 110 parts |
| Methyl ethyl ketone | 100 parts |
| Toluene | 100 parts |
| Butyl stearate | 2 parts |
| Stearic acid | 1 part |

2. Preparation of Coating Liquid for Non-Magnetic Layer for Lower Layer:

| | |
|---|---|
| Non-magnetic inorganic powder | 85 parts |
| α-Iron oxide | |
| Surface treating agent: Al$_2$O$_3$, SiO$_2$ | |
| Long axis size: 0.15 μm | |
| Axial ratio: 7 | |
| Carbon black | 15 parts |
| DBP oil absorption: 120 mL/100 g | |
| Specific surface area by the BET method (S$_{BET}$): 250 m$^2$/g | |
| Vinyl chloride copolymer | 12 parts |
| (containing 1 × 10$^{-4}$ eq/g of an —SO$_3$Na group, degree of polymerization: 300) | |
| Polyester polyurethane resin | 5 parts |
| (neopentyl glycol/caprolactone polyol/MDI = 0.9/2.6/1, containing 1 × 10$^{-4}$ eq/g of an —SO$_3$Na group) | |
| Phenylphosphonic acid | 3 parts |
| Cyclohexanone | 140 parts |
| Methyl ethyl ketone | 170 parts |
| Butyl stearate | 2 parts |
| Stearic acid | 1 part |

With respect to the foregoing magnetic coating composition for upper layer and the foregoing non-magnetic coating composition for lower layer, the respective components were kneaded in an open kneader for 60 minutes and then dispersed in a sand mill for 120 minutes. To the resulting dispersion, 6 parts pf a trifunctional low-molecular polyisocyanate compound (CORONATE 3041 manufactured by Nippon Polyurethane Industry Co., Ltd.) was added, and the mixture was further mixed with stirring for 20 minutes and then filtered using a filter having an average pore size of 1 μm, thereby preparing a magnetic coating material and a non-magnetic coating material.

On a 7 μm-thick polyethylene naphthalate non-magnetic support having an intrinsic viscosity of 0.53 dL/g and made of two layers having a center plane average surface roughness of 4 nm on the magnetic layer coating face (A face) and 8 nm on the back face (B face) of the magnetic layer coating face, respectively, the non-magnetic coating liquid was coated in a thickness after drying of 1.5 μm, and immediately thereafter, the coating liquid for magnetic layer was subjected to simultaneous double jet coating in a thickness after drying of 0.1 μm. Magnetic field orientation was carried out using a magnet of 300 T·m (3,000 gausses) in the state that the magnetic layer and the non-magnetic layer were not dried yet. After drying, the laminate was subjected to a surface smoothening treatment using a 5-stage calender constructed of only metal rolls under a linear pressure of 300 kg/cm at a temperature of 90° C. Thereafter, the resulting laminate was heat treated at 70° C. for 48 hours and slit into a width of ½ inch, thereby preparing a magnetic tape.

Composition of Back Layer

Kneaded Mixture (1):

| | |
|---|---|
| Carbon black A, particle size: 40 mμ | 100 parts |
| Nitrocellulose, RS1/2 | 50 parts |
| Polyurethane resin (glass transition temperature: 50° C.) | 40 parts |
| Dispersant: Copper oleate | 5 parts |
| Copper phthalocyanine | 5 parts |
| Precipitated barium sulfate | 5 parts |
| Methyl ethyl ketone | 500 parts |
| Toluene | 500 parts |
| Kneaded mixture (2): | |
| Carbon black B, SSA: 8.5 m$^2$/g | 100 parts |
| Mean particle size: 270 mμ | |
| DBP oil absorption: 36 mL/100 g, pH: 10 | |
| Nitrocellulose, RS1/2 | 40 parts |
| Polyurethane resin | 10 parts |
| Methyl ethyl ketone | 300 parts |
| Toluene | 300 parts |

The kneaded mixture (1) was kneaded in a roll mill, and the kneaded mixtures (1) and (2) were then dispersed in a sand grinder. Thereafter, the following were added thereto, thereby preparing a dispersion for back layer. The coating liquid for magnetic layer was coated on the non-magnetic support and dried, and the foregoing dispersion for back layer was then coated thereon.

| | |
|---|---|
| Polyester resin | 5 parts |
| Polyisocyanate | 5 parts |

Magnetic characteristics of the resulting sample were measured using a vibrating sample magnetometer, from which were then measured magnetoelectric transform characteristics and weather resistance of the magnetic layer. The respective measurements were carried out according to the following methods.

(1) Magnetic Characteristics of Magnetic Recording Medium:

The magnetic characteristics were measured in parallel to the orientation direction in an external magnetic field of 796 kA/m by a vibrating sample magnetometer (manufactured by Toei Industry Co., Ltd.).

(2) Magnetoelectric Transform Characteristics:

The magnetoelectric transform characteristics were measured using a reel-to-reel test mounted with a commercially available head under the following conditions.

| | |
|---|---|
| Relative speed: | 2 mm/sec |
| Recording track width: | 18 μm |
| Reproducing track width: | 10 μm |
| Distance between shields: | 0.27 μm |
| Signal generator for recording: | 8118 A (manufactured by HP) |
| Reproducing signal processing: | Spectrum analyzer |

The C/N was defined from the peak to the degaussing noise of the reproducing carrier, and the resolution band width of the spectrum analyzer was fixed to be 100 kHz. The magnetoelectric characteristics were expressed based on the characteristics of the tape as used in Example 3. The measurement was carried out by recording signals having a linear recording density of 140 KFCI and 110 KFCI and reproducing by an MR head.

(3) Weather Resistance (ΔΦm (%)) of Magnetic Layer:

The measurement of the weather resistance (ΔΦm (%)) of the magnetic layer was carried out according to the foregoing method.

TABLE 3

| | Long axis length | | Axial ratio | | Oxide film | | Medium characteristics | | Linear recording density: 140 KFCI | | Linear recording density: 110 KFCI | | Demagnetization (%) |
|---|---|---|---|---|---|---|---|---|---|---|---|---|---|
| | Average value (nm) | Coefficient of variation (%) | Axial ratio | Coefficient of variation (%) | Film thickness | Coefficient of variation (%) | Hc (Oe) | SQ | Output (dB) | CNR (dB) | Output (dB) | CNR (dB) | |
| Example 1 | 47.8 | 20.3 | 4.2 | 15.7 | 2.9 | 14.3 | 2557 | 0.83 | 1.2 | 1.1 | 0.9 | 0.4 | 9 |
| Example 2 | 45.2 | 19.3 | 4.4 | 18.2 | 3.2 | 14.6 | 2506 | 0.85 | 2.2 | 2.4 | 1.6 | 1.5 | 5 |
| Example 3 | 38.7 | 24.9 | 4.0 | 15.6 | 3.3 | 12.4 | 2012 | 0.78 | 0 | 0 | 0 | 0 | 4 |
| Example 4 | 53.4 | 23.9 | 5.3 | 17.7 | 3.2 | 14.5 | 2591 | 0.87 | 2.7 | 1.3 | 1.3 | 0.8 | 4 |
| Example 5 | 49.0 | 22.7 | 4.9 | 19.7 | 2.6 | 11.5 | 2375 | 0.86 | 1.3 | 0.8 | 1.3 | 0.1 | 8 |
| Comparative Example 1 | 58.1 | 27.3 | 5.2 | 19.9 | 3.3 | 14.1 | 2604 | 0.88 | 2 | −0.9 | 1.4 | 0 | 3 |
| Comparative Example 2 | 46.8 | 25.9 | 4.2 | 22.3 | 2.9 | 11.9 | 2375 | 0.85 | −2.3 | −1.4 | −0.5 | 0.3 | 5 |
| Comparative Example 3 | 42.5 | 23.6 | 4.5 | 19.0 | 2.8 | 27.3 | 2336 | 0.81 | 0.5 | 2.1 | 0.5 | 1.3 | 14 |
| Comparative Example 4 | 29.6 | 27.3 | 4.0 | 26.0 | 2.2 | 18.0 | 1823 | 0.74 | −3.8 | −4.3 | −2.7 | −2.5 | 25 |
| Comparative Example 5 | 78.1 | 31.2 | 5.4 | 17.5 | 3.3 | 13.8 | 2340 | 0.89 | 2.8 | −3.5 | 2.3 | −1.9 | 3 |

As is clear from Table 3, the magnetic recording media using a ferromagnetic metal powder having an average long axis length of from 30 to 55 nm in terms of particle size, a coefficient of variation of long axis length of not more than 25%, a coefficient of variation of axial ratio of not more than 20%, and a coefficient of variation of oxide film thickness of not more than 15% were excellent in the demagnetization (ΔΦm (%)) after storing at 60° C. and 90% RH for one week and were good in both the output and the C/N in the magnetoelectric transform characteristics.

Also, in comparison with the case of recording the magnetic recording medium with signals at 110 KFCI and reproducing using a magnetoresistive (MR) head, the case of recording and reproducing at a higher density of 140 KFCI was good in both the output and C/N.

This application is based on Japanese Patent application JP 2004-90471, filed Mar. 25, 2004, the entire content of which is hereby incorporated by reference, the same as if set forth at length.

What is claimed is:

1. A magnetic recording medium comprising a non-magnetic support and a magnetic layer containing a ferromagnetic metal powder and a binder, wherein the ferromagnetic metal powder comprises an oxide layer and a metal portion surrounded by the oxide layer, and the ferromagnetic metal powder has an average long axis length of from 30 nm to 55 nm, a coefficient of variation of long axis length of not more than 25%, a coefficient of variation of axial ratio of not more than 20%, and a coefficient of variation of a thickness of the oxide layer of not more than 15%.

2. The magnetic recording medium according to claim 1, further comprising a substantially non-magnetic lower layer between the magnetic layer and the non-magnetic support.

3. The magnetic recording medium according to claim 1, wherein the ferromagnetic metal powder has an average long axis length of from 30 nm to 50 nm.

4. The magnetic recording medium according to claim 1, wherein the ferromagnetic metal powder has a coefficient of variation of long axis length of not more than 20%.

5. The magnetic recording medium according to claim 1, wherein the ferromagnetic metal powder has a coercive force of from 160 to 320 kA/m.

6. The magnetic recording medium according to claim 1, wherein the ferromagnetic metal powder has a coercive force of from 165 to 280 kA/m.

7. The magnetic recording medium according to claim 1, wherein the ferromagnetic metal powder has a coercive force of from 167 to 230 kA/m.

8. The magnetic recording medium according to claim 1, wherein the ferromagnetic metal powder is a spindle type acicular particle, has an average axial ratio of from 3.5 to 5.5, and contains Fe, Co, Al and a rare earth element, in which a content of Co is from 5 to 45 atomic % in terms of Co/Fe, a content of Al is from 4 to 10 atomic % in terms of Al/Fe, and a content of the rare earth element is 10 atomic % or more in terms of (total sum of the rare earth elements)/Fe.

9. The magnetic recording medium according to claim 8, wherein the rare earth element is at least one member selected from Y, La, Ce, Pr, Nd, Sm, and Gd.

10. The magnetic recording medium according to claim 1, wherein an increase of the coercive force falls within 2.5%.

11. The magnetic recording medium according to claim 1, wherein the magnetic layer has a residual magnetic flux of from 5 to 75 mT·μm.

12. The magnetic recording medium according to claim 1, wherein the magnetic layer has a residual magnetic flux of from 10 to 70 mT·μm.

13. The magnetic recording medium according to claim 1, further comprising a non-magnetic layer containing a non-magnetic powder and a binder resin between the non-magnetic support and the magnetic layer, wherein the magnetic layer has a center plane average surface roughness of not more than 3.0 nm.

14. A recording and reproducing method of a magnetic recording medium, which comprises reproducing signals recorded on the magnetic recording medium according to claim 1 at a maximum linear recording density of 140 KFCI or more with a magnetoresistive head.

* * * * *